United States Patent
Hart

(10) Patent No.: US 8,605,589 B2
(45) Date of Patent: *Dec. 10, 2013

(54) DYNAMIC CLASSIFICATION AND GROUPING OF NETWORK TRAFFIC FOR SERVICE APPLICATION

(75) Inventor: Justin Scott Hart, Purton (GB)

(73) Assignee: Sonus Networks, Inc., Westford, MA (US)

( * ) Notice: Subject to any disclaimer, the term of this patent is extended or adjusted under 35 U.S.C. 154(b) by 744 days.

This patent is subject to a terminal disclaimer.

(21) Appl. No.: 12/873,940

(22) Filed: Sep. 1, 2010

(65) Prior Publication Data

US 2012/0051219 A1    Mar. 1, 2012

(51) Int. Cl.
*H04L 1/00*    (2006.01)

(52) U.S. Cl.
USPC ........ 370/235; 370/230; 370/230.1; 370/231; 370/395.21; 709/223; 709/224; 709/225; 709/232

(58) Field of Classification Search
None
See application file for complete search history.

(56) References Cited

U.S. PATENT DOCUMENTS

| | | | | |
|---|---|---|---|---|
| 6,452,915 | B1 | 9/2002 | Jorgensen | 370/338 |
| 6,542,508 | B1 | 4/2003 | Lin | 370/395.43 |
| 6,591,299 | B2 | 7/2003 | Riddle et al. | 709/224 |
| 2004/0063497 | A1* | 4/2004 | Gould | 463/42 |
| 2007/0220588 | A1 | 9/2007 | Panda et al. | 726/1 |
| 2008/0192629 | A1* | 8/2008 | Chari | 370/230 |
| 2008/0192753 | A1 | 8/2008 | Li | 370/395.21 |
| 2008/0201722 | A1 | 8/2008 | Sarathy | 719/311 |
| 2009/0182874 | A1* | 7/2009 | Morford et al. | 709/224 |
| 2009/0190592 | A1 | 7/2009 | Hsieh et al. | 370/392 |
| 2009/0227231 | A1 | 9/2009 | Hu et al. | 455/410 |
| 2009/0232015 | A1 | 9/2009 | Domschitz et al. | 370/252 |
| 2009/0268720 | A1 | 10/2009 | Veenstra et al. | 370/352 |
| 2010/0031323 | A1 | 2/2010 | Wiryaman et al. | 726/4 |

OTHER PUBLICATIONS

Kounavis et al., "Two stage packet classification using most specific filter matching and transport leveling," *Science Direct*, vol. 51 (2007), pp. 4951-4978.

Cisco Systems, "Diffsery—The Scalable End-to-End Quality of Service Model," (Aug. 2005), 18 pages.

* cited by examiner

*Primary Examiner* — Ian N Moore
*Assistant Examiner* — Brian T Le
(74) *Attorney, Agent, or Firm* — Straub & Pokotylo; Michael P. Straub; Stephen T. Straub

(57) ABSTRACT

Methods and apparatuses, including computer program products, are described for applying service based on classification and grouping of traffic flows. The method includes receiving a traffic flow, and matching the traffic flow to classification groups. The matching includes determining a first event associated with the traffic flow, comparing attributes of the first event with entry criteria of the classification groups, and assigning the first event to one or more classification groups where the first event meets the entry criteria of the one or more classification groups. The method includes identifying one or more service definitions for the traffic flow based on the classification groups assigned to the traffic flow, reconciling the one or more service definitions for the traffic flow, and providing a service to the traffic flow based on the reconciled service definitions.

36 Claims, 10 Drawing Sheets

DYNAMIC CLASSIFICATION AND GROUPING OF NETWORK TRAFFIC FOR SERVICE APPLICATION

FIELD OF THE INVENTION

The subject matter of this application relates generally to methods and apparatuses, including computer program products, for dynamic classification and grouping of network traffic for service application.

BACKGROUND OF THE INVENTION

In the field of telecommunications, it is common for different classes of network traffic to exist. Network traffic is classified by a variety of means. A common example is traffic belonging to a particular subscriber to the network. Subscribers are grouped into different classifications for a variety of reasons, including, but not limited to, the level of service purchased (minutes, bandwidth, features etc), their location/ geography, the type of handset/user equipment (UE) utilized, the business or enterprise to which they belong, or the network segment/server or point-of-interconnect to which they are assigned/attached.

Different nodes in the network may have lesser or greater (or even completely different) knowledge about these classifications. Generally, it is incumbent upon the network provider to manually manage the subscriber classification definitions on each node to ensure that a subscriber's traffic flow receives common treatment regardless of which node it traverses. For example, network operators may be required to pre-configure (static) data to define these groups and allocate subscribers to these groups, thus incurring an Operations, Administration, and Management (OA&M) cost to set up a subscriber and again each time a service or subscriber changes.

In addition, classifications/grouping constructs within a network node's data model typically have a fixed meaning (as determined by the equipment vendor's software), and may not match the network operator's view of how it classifies subscribers or defines services. As a result, equipment vendors either develop custom software for network operators, or the network operator compromises its desired classification schema (in terms of costs, efficiencies, or quality of service delivered).

Also, classification/grouping data models are frequently flat or hierarchical, which can make it difficult to have subscribers belong to multiple classifications simultaneously. In a network that includes software from multiple vendors (e.g., a mixed vendor network), data models between nodes are frequently different. Thus, a network operator may have difficulty defining a consistent classification and service view for a given subscriber or service across all the equipment through which the subscriber's service is delivered.

SUMMARY OF THE INVENTION

In general overview, the techniques described herein are related to applying service based on classification and grouping of traffic flows. The techniques advantageously provide for configuration of abstract classifications that are not strictly bound to other elements within a data model. In addition, the techniques provide for dynamic evaluation of the network traffic to learn the classification(s) to which a subscriber or traffic flow belongs. This dynamic evaluation can be achieved by matching the content of signaling or media exchanged with some pre-defined pattern or criteria—particularly where the pattern or criteria includes stateful information related to a sequence of events. The techniques also allow for binding, into a group, sets of subscribers or traffic flows that match a specified classification. Common service treatment can be provided to that group. The techniques further provide for continued evaluation of matching criteria to determine whether the group membership of a subscriber or other entity should change. The change can include addition or deletion of group membership.

The invention, in one aspect, features a method for applying service based on classification and grouping of traffic flows. The method includes receiving, at a network server, a traffic flow, and matching, by the network server, the traffic flow to classification groups. The matching includes determining a first event associated with the traffic flow, comparing attributes of the first event with entry criteria of the classification groups, and assigning the first event to one or more classification groups where the first event meets the entry criteria of the one or more classification groups. The method also includes identifying, by the network server, one or more service definitions for the traffic flow based on the classification groups assigned to the traffic flow, reconciling, by the network server, the one or more service definitions for the traffic flow, and providing, by the network server, a service to the traffic flow based on the reconciled service definitions.

The invention, in another aspect, features a system for applying service based on classification and grouping of traffic flows. The system includes a network server configured to receive a traffic flow, and match the traffic flow to classification groups. The matching includes determining a first event associated with the traffic flow, comparing attributes of the first event with entry criteria of the classification groups, assigning the first event to one or more classification groups where the first event meets the entry criteria of the one or more classification groups, and identifying, by the network server, one or more service definitions for the traffic flow based on the classification groups assigned to the traffic flow. The network server is also configured to reconcile the one or more service definitions for the traffic flow, and provide a service to the traffic flow based on the reconciled service definitions.

In some embodiments, any of the above aspects can include one or more of the following features. In some embodiments, the first event is automatically assigned to one or more additional classification groups based on its assignment to the one or more classification groups. The automatic assignment of the first event to one or more additional classification groups can be based on instructions in the one or more classification groups. The first event can be automatically excluded from one or more additional classification groups based on its assignment to the one or more classification groups. The automatic exclusion of the first event from one or more additional classification groups can be based on instructions in the one or more classification groups.

In some embodiments, the first event is the start of a sequence of events. The matching can further include analyzing a second event associated with the traffic flow to determine whether the second event is related to the first event, and assigning the second event to the one or more classification groups assigned to the first event. Analyzing the second event can include comparing attributes of the second event with a list of members belonging to the one or more classification groups, wherein the first event is assigned to a member in the list of members. In some embodiments, the matching further includes comparing attributes of the second event with entry criteria of one or more additional classification groups, and assigning the second event to the one or more additional classification groups where the second event meets the entry criteria of the one or more additional classification groups.

In some embodiments, for processing of the second event by the network server, the one or more additional classification groups override the classification groups previously assigned to the second event. The matching further includes excluding the second event from one or more of the classification groups assigned to the first event based on assignment of the second event to the one or more additional classification groups. Exclusion of the second event from one or more of the classification groups assigned to the first event can be based on instructions in the one or more additional classification groups.

In some embodiments, the first event is the start of a sequence of events. The matching can further include binding the sequence of events to the one or more classification groups assigned to the first event, and assigning subsequent events in the sequence of events to the one or more classification groups assigned to the first event. In some embodiments, binding the sequence of events to the one or more classification groups further includes generating a data structure in each classification group of the one or more classification groups. The data structure can include a reference to the sequence of events.

In some embodiments, the first event is the start of a sequence of events, and the matching includes instantiating a context control block upon determining the first event. The matching can further include storing indicia associated with the classification groups assigned to the first event in the context control block, analyzing, based on the stored indicia, subsequent events in the sequence of events associated with the traffic flow to determine whether the subsequent events are related to the first event, and assigning the subsequent events to the one or more classification groups assigned to the first event and stored in the context control block. The subsequent events can be assigned to one or more additional classification groups where an attribute of the first event and an attribute of the second event are combined to meet entry criteria of the one or more additional classification groups. The stored indicia can be modified based on the analysis of the subsequent events. The classification group assignment of the subsequent events can be modified based on the analysis of the subsequent events. Modifying the classification group assignment of the subsequent events can include adding the subsequent events to one or more additional classification groups, removing the subsequent events from one or more of the classification groups previously assigned to the subsequent events, or both. The context control block can include a finite state machine and a context.

In some embodiments, comparing attributes of the first event with entry criteria of the classification groups includes identifying one or more attributes associated with the first event, comparing the identified attributes to the entry criteria, and determining whether the identified attributes match the entry criteria. In some embodiments, reconciling the one or more service definitions for the traffic flow includes configuring logic of the one or more service definitions to manage interactions between the service definitions. In some embodiments, providing a service to the traffic flow includes identifying a condition associated with the network, and modifying the classification group assignment of the traffic flow based on analyzing the condition associated with the network. The condition associated with the network can include availability of resources within a node connected to the network server, bandwidth utilization between nodes in the network, availability of alternative routes between nodes in the network, or any combination thereof. The availability of a node connected to the network server can be based on a workload level associated with the node. The availability of resources within a node connected to the network server can be based on availability of data processing services offered by the node.

In some embodiments, providing a service to the traffic flow includes executing logic associated with the reconciled service definitions associated with the traffic flow. The classification group assignment of the traffic flow can be modified based on execution of the logic associated with the reconciled service definitions. The entry criteria of the classification groups can include: rules for determining membership in the classification groups, parameters for determining membership in the classification groups, policies for determining membership in the classification groups, and/or patterns for determining membership in the classification groups.

In some embodiments, the attributes of the first event include signaling data, media content data, state data, or any combination thereof. In some embodiments, the classification groups are independent of each other. In some embodiments, the classification groups are independent of the service definitions.

In some embodiments, the network server receives the definition of the classification groups from a central broadcast server. In some embodiments, the network server includes a user interface, which receives configuration instructions for the classification groups. In some embodiments, the user interface includes a display for viewing the classification groups and related configuration.

DETAILED DESCRIPTION

Figure 1:
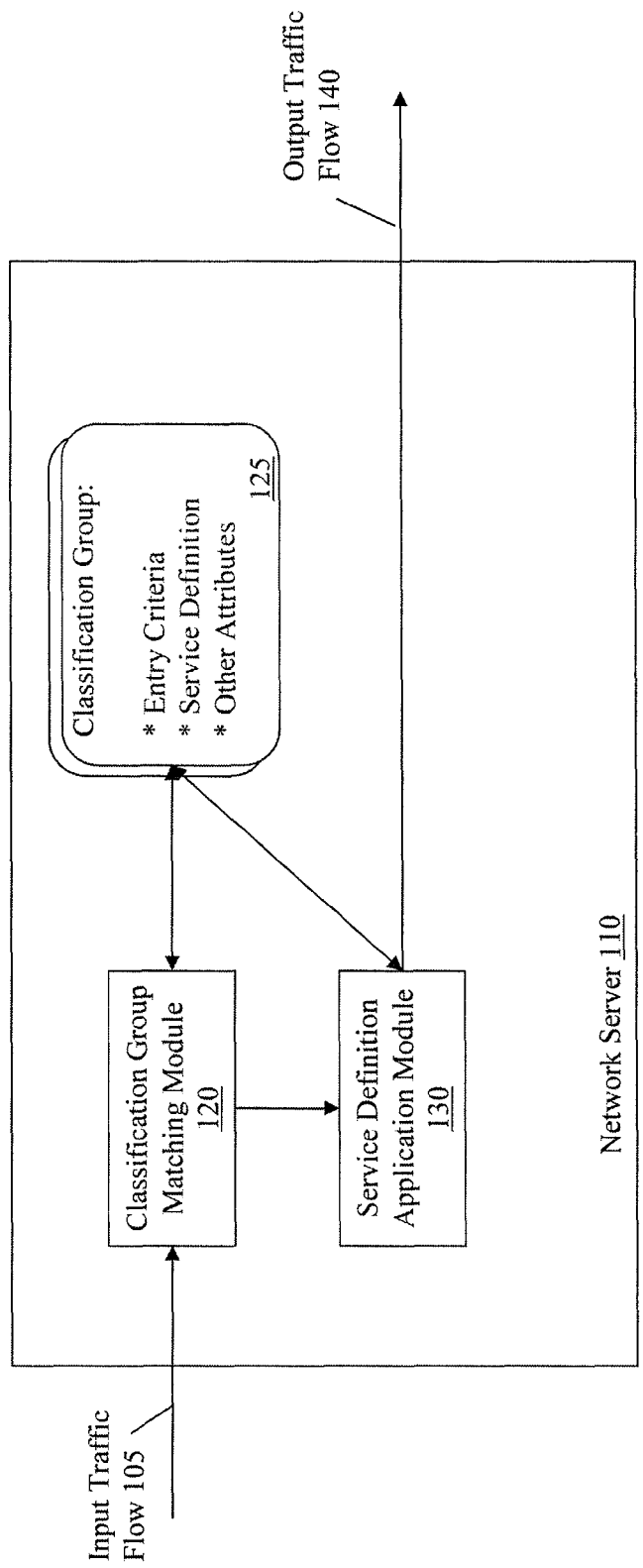
FIG. 1 is a block diagram of an exemplary system for dynamic classification and grouping of network traffic for service application.

FIG. 1 is a block diagram of an exemplary system 100 for dynamic classification and grouping of network traffic for service application. The system 100 includes an input traffic flow 105 received from a communications network, a network server 110 which includes a classification group matching module 120, one or more classification groups 125, a service definition application module 130, and an output traffic flow 140 transmitted to a communications network.

In some embodiments, the network server 110 is a session border controller (SBC), an application server, a switching node, or another type of device connected to a communications network. One of ordinary skill in the art will understand that the techniques described herein can be implemented on many different server types or computing devices without departing from the spirit or scope of the invention.

In some embodiments, the classification group matching module 120 is a hardware or software module (e.g., implemented on a processor or other computing device) that matches the traffic flow 105 to one or more classification groups 125. The service definition application module 130 is a hardware or software module (e.g., implemented on a processor or other computing device) that applies service definition logic to the traffic flow 105 based on the matched classification groups.

In some embodiments, the traffic flow 105 is received from a subscriber to a service provider's network. For example, a "subscriber" can be an individual user, a group of users, a business, a corporation, or an entity that can access the service provider's network. One of ordinary skill in the art will understand that the techniques described herein are not limited to application on network traffic initiated or provided by a particular configuration of subscribers or users.

In some embodiments, the classification group matching module 120 and the service definition application module 130 are located on a computing device (e.g., network server 110) which acts as a gateway or interface between the subscriber's network and the service provider's network (e.g., a session border controller). The network server 110 receives the traffic flow 105. For example, the network server 110 can receive the traffic flow 105 from a subscriber, another network entity, or a separate communications network. After determination of the classification groups 125 and application of the service definitions, the network server 110 transmits the traffic flow 140 to the service provider. In some embodiments, the network server 110 is an application server which provides content, services, and functionality to other entities on the network.

In some embodiments, the traffic flow 105 can include a series of packets, which are units of data formatted for transmission over a communications network. A packet generally includes metadata and a payload. The packet metadata includes attributes related to the packet (e.g., arrival information, destination information, origin information, encoding protocols, or structure of information in the packet). The payload includes the user data to be transmitted.

One or more of the packets in the traffic flow 105 can include an event. In some embodiments, the event is associated with the signaling protocol (e.g., Session Initiation Protocol or "SIP") of the traffic flow 105. For example, the event can be an SIP REGISTER request or an SIP INVITE request. Events in the traffic flow 105 can be related to each other, for example, on the basis of their sequence in the traffic flow 105. In some embodiments, the event is associated with the media content (e.g., media type, encoding protocol, etc.) of the traffic flow 105. For example, the event can be based on a particular codec used by the subscriber's equipment or network.

While each of the components 120, 125, 130 are represented in FIG. 1 as being contained within a single physical device (e.g., network server 110), the components can alternatively reside in two or more different physical devices. The components and/or devices can communicate via a communications network, such as, for example, a local network (e.g., LAN) or a wide area network (e.g., Internet).

In some embodiments, the network server 110 provides a user-programmable interface that allows the operator of the communications network associated with the network server 110 to define rules such that the signaling content can be manipulated. In some examples, such functionality is called Signaling Manipulation Functionality (SMF). SMF can be used as a generic term to include any such manipulation capability irrespective of a particular vendor's device. The techniques described herein utilize the SMF capability in part to solve the problems described above.

Generally, SMF can be implemented in a variety of different ways, as the operator of the communications network has the ability to specify multiple rules. In some examples, a rule includes two parts: a Match and an Action. A Match can define a pattern to look for in the attributes associated with a traffic flow, and an Action can define some action to take place, such as replacing a data element in the attributes of a traffic flow with a new value.

In some SMF implementations, there is not a strict 1:1 relationship between Match and Action. A Match condition may result in multiple Actions, or the implementation can require multiple Match conditions to be satisfied in order for an Action to be taken.

In some embodiments, the techniques described herein utilize the Match capabilities of SMF alongside a type of Action function that assigns the subscriber, traffic flow, or an event included in the traffic flow to a classification group (as opposed to the normal Action of a manipulation on some aspect of the signaling). In the example where a rule has multiple Action parts, the techniques described herein can invoke classification Actions and also traffic flow attribute manipulation Actions.

Figure 2:
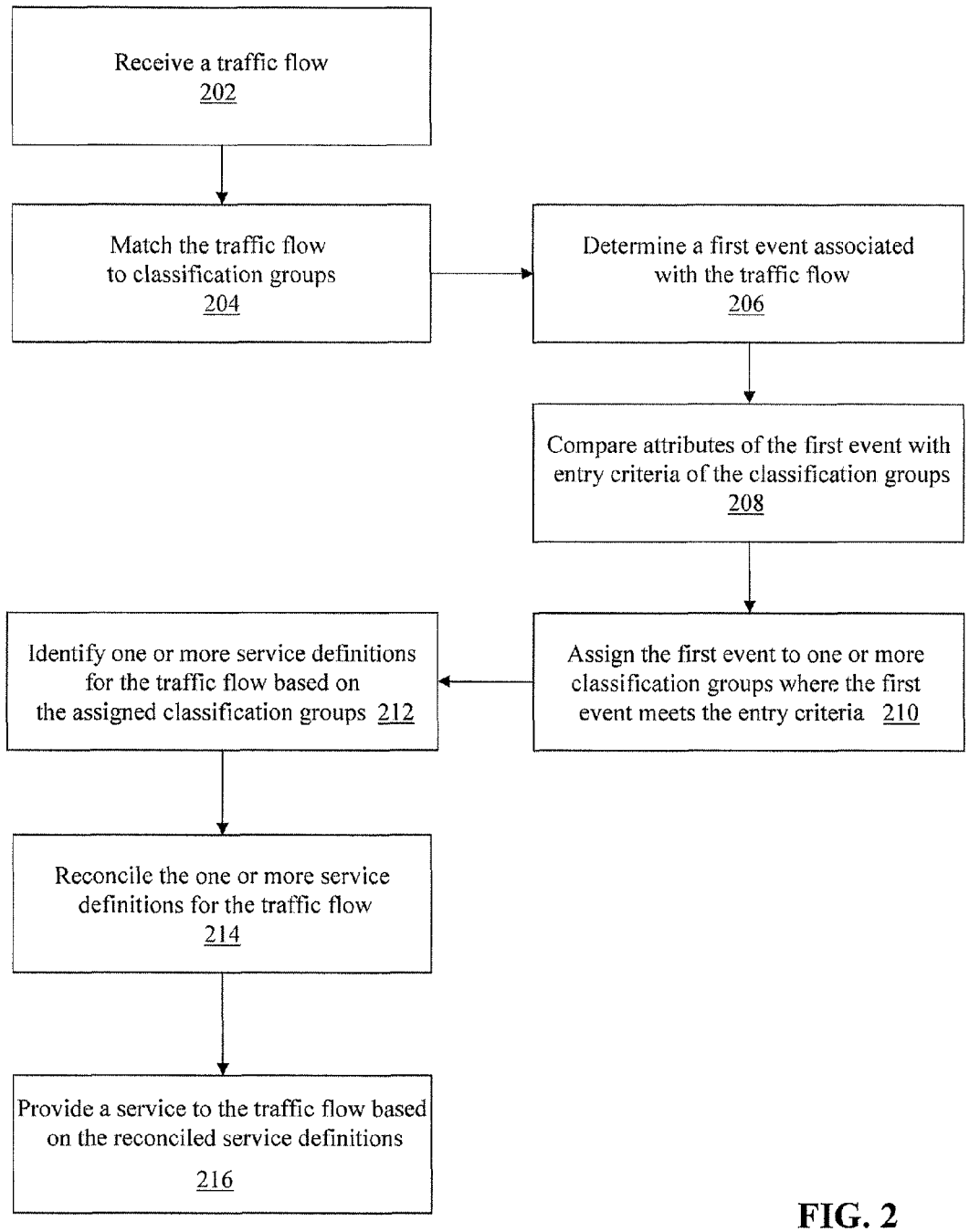
FIG. 2 is a flow diagram of an exemplary method for dynamic classification and grouping of network traffic for service application.

FIG. 2 is a flow diagram 200 of an exemplary method for dynamic classification and grouping of network traffic for service application. The network server 110 receives (202) the traffic flow 105. For example, the network server 110 can receive the traffic flow 105 from a computing device operated by the subscriber, a network utilized by the subscriber, among other sources. The classification group matching module 120 of the network server 110 matches (204) the traffic flow 105 to one or more classification groups 125. In some embodiments, the classification groups 125 are stored on the network server 110 (e.g., in a local database or memory module). In other embodiments, the classification groups 125 are retrieved from another location in the service provider's network.

In performing the matching step, the classification group matching module 120 determines (206) a first event associated with the traffic flow 105. The classification group matching module 120 compares (208) attributes of the first event with entry criteria of the classification groups 125. The classification group matching module 120 assigns (210) the first event to one or more classification groups 125 where the first event meets the entry criteria of those classification group(s). The service definition application module 130 identifies (212) one or more service definitions for the traffic flow 105 based on the assigned classification groups 125. The service definition application module 130 reconciles (214) the one or more identified service definitions for the traffic flow 105. The service definition application module 130 provides (216) a service to the traffic flow 105 based on the reconciled service definitions.

Extension of Matching Criteria to Multiple States

In some embodiments, the techniques described herein advantageously include a matching system (e.g., system 100) capable of matching against multiple events. Instead of being limited to pattern match rule(s) against one message only, the system 100 can include a finite state machine (FSM), which can include match criteria to be applied against multiple events in a traffic flow. Thus, in some embodiments, classification group membership is defined based on a sequence of events in a traffic flow. Furthermore, the sequence of events is matched based on the content and/or type of the events. For example, two classification groups can be defined with the following sets of rules:

| Group | Rules |
| --- | --- |
| Registering Users | Rule 1: Matches for reception of register |
|  | Rule 2: Matches for sending 401 unauthorized |
| Registered Users | Rule 1: Matches for reception of register |
|  | Rule 2: Matches for sending of 200 OK |

In these embodiments, the rules associated with a classification group are defined as an FSM. Subsequent rules are active or tested only if previous rules are matched.

In the example classification groups presented above, when the traffic flow attributes (e.g., signaling exchange) match the first group (e.g., "Registering Users"), it indicates one or more users attempting to register, but either the network server 110 or a computing device further along the traffic flow path is asking for credentials to ensure the user is authorized. When the traffic flow attributes match the second classification group (e.g., "Registered Users"), it indicates that one or more users has completed registration. In this example, the treatment afforded to traffic flows (e.g., traffic flow 105) from the same source (e.g., subscriber network) is different based on the policies or service definitions associated with the first classification group ("Registering Users") versus the second classification group ("Registered Users"). For example, the system 100 can only allow a subscriber to initiate calls (e.g., SIP INVITE requests) when fully authenticated, as represented by belonging to the "Registered Users" classification group.

Media Matching

In some embodiments, the system 100 matches a traffic flow (e.g., traffic flow 105) by examining the type of media associated with the traffic flow 105. Some examples of this technique include deep packet inspection (DPI) or deep packet manipulation (DPM) technology to identify types of traffic based on matching patterns/rules about the contents of the packets. In these embodiments, the system 100 uses pattern matching capability of DPI or DPM to determine the type of media associated with the traffic flow 105, and then uses the media type as one of the entry criteria for the classification groups 125. For example, in addition to specifying rules pertaining to signaling content, the system 100 also supports DPI, DPM, or any other media classification technology for use in classification group matching.

Classification Groups and Service Definitions

Figure 3A:
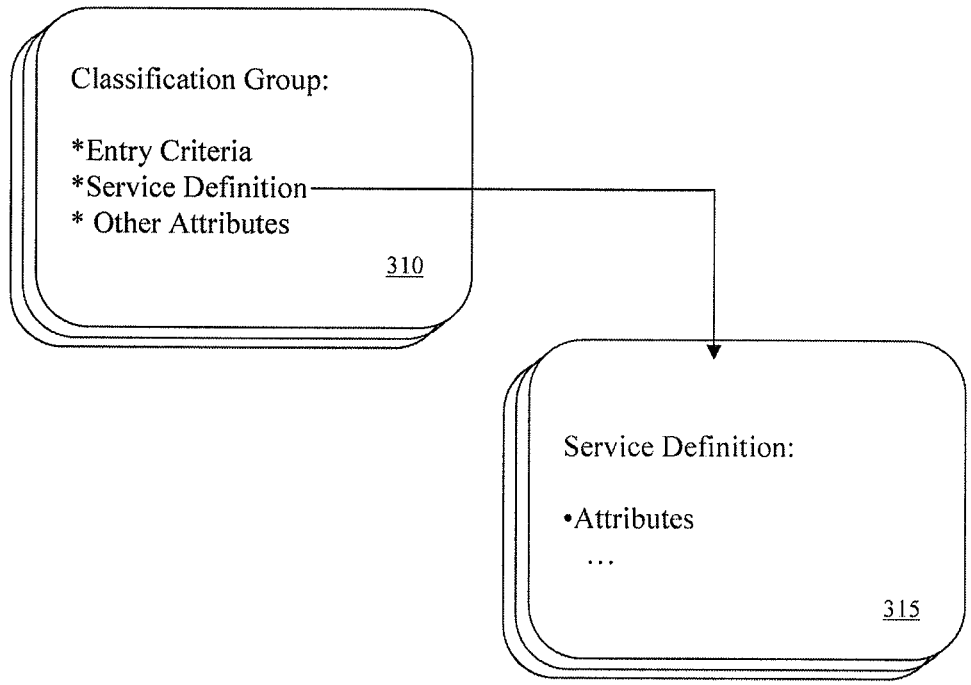
FIG. 3A is a diagram of classification groups with discrete service definition attributes.
Figure 3B:
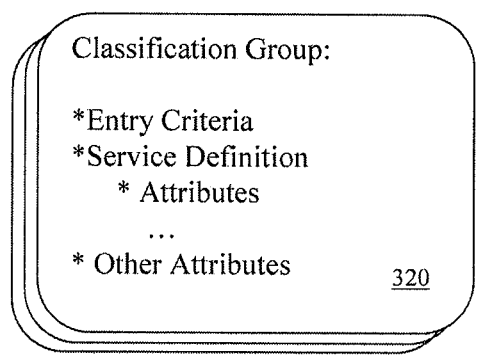
FIG. 3B is a diagram of classification groups with embedded service definition attributes.

FIGS. 3A & 3B are diagrams of classification groups.

In some embodiments, the classification groups (e.g., classification groups 310 and 320) are located on the network server 110 that receives traffic flows 105. In some embodiments, the attributes of a classification group are as follows:

Entry Criteria can define the matching conditions for an entity to be included in the classification group. In one embodiment, the entry criteria include an associated list of Match clauses from an SMF function. The entry criteria can include utilization of DPI pattern matching on the traffic flow 105. The entry criteria can include the combination of multiple rules based on an FSM spanning multiple events. The network server 110 of the system 100 can receive incoming events through the traffic flow 105 and test the events against the entry criteria (e.g., Match clauses) of the classification groups (e.g., 310 or 320). If the events meet the entry criteria, the system 100 assigns the events (and, in some embodiments, any subsequent associated event, such as those coupled by a binding or an FSM) to the classification groups (e.g., 310 or 320).

Service Definition (e.g., service definition 315) can define the type of service that the entities (typically subscribers) receive in common. In some embodiments, the service definition 315 is a label or name that is used by other modules of the system 100 to look up data in other tables or parts of the data model. The service definition 315 can be a profile describing detailed attributes that define the common service. Examples include the following, although one skilled in the art will understand there are other ways the service definition 315 can be defined:

a. Common bandwidth/call restrictions (e.g., the Call Admission Control (CAC) or leaky-bucket attributes);
b. Features that are permitted (e.g., Class-5 features in a VoIP access environment);
c. Transcoding capabilities that are offered;
d. Routing or server allocation (e.g., which registrar to direct network traffic).

In some embodiments, additional attributes can be defined as part of the classification group 310/320. Examples include the following, although one skilled in the art will understand there are other attributes that can be included in the classification group 310/320:

1) Additional classification group relationships:
   a. A list of one or more additional classification groups that the entity automatically belongs to by virtue of its membership in the initial classification group;
   b. A list of one or more classification groups that the entity is automatically removed from by virtue of its membership in the initial classification group.

For example, membership in the initial classification group can have priority to override the entity's membership in other classification groups, or membership in the initial classification group can be mutually exclusive to membership in other classification groups. Any of the classification groups can include instructions that operate to determine an entity's membership in other classification groups (e.g., automatically include the entity in other groups, automatically exclude or remove the entity from other groups, etc.).

2) Maximum number of entries: this attribute defines the maximum number of entities (e.g., subscribers) that can be members of the classification group. For example, service (or specific classification(s) of service) can be refused to entities that attempt to join the classification group after the maximum number of entries has been met.

3) Time-of-Day/Day-of-Week etc.—this attribute defines the period(s) when the classification group is valid and available to apply the associated service. For example, the service associated with the classification group would not be available outside of the period(s) of time denoted in this attribute.

In some embodiments, the order of the classification group matches for the classification group relationships attribute is important because some degree of brokering or ordering logic is required to reconcile the group relationships into a merged set or sets. Also, in some embodiments, reconciliation of the group relationships requires suitable validation logic to catch illegal or redundant group combinations or to warn the system 100 about combinations having unintended service consequences.

In some embodiments, the service definition attributes are embedded directly in the classification group (e.g., classification group 320 in FIG. 3B). In other embodiments, the service definition attributes (e.g., service definition 315 in FIG. 3A) are distinct from the classification group (e.g., classification group 310 in FIG. 3A). Logically, there can be two types of attributes: those that define the scope of membership in the classification group 310 (e.g., entry criteria) and those that define the service to be delivered to members of the classification group 310 (e.g., service definitions).

FIG. 3A is a diagram of classification groups (e.g., classification group 310) with discrete service definition 315 attributes. An advantage of separate service definition 315 attributes is that the same service definition can be extended to multiple classification groups (e.g., 310) without replicating the service definition 315 data. In addition, separate service definition 315 attributes can allow the sharing of stateful data (e.g., call counts, rate limits) across multiple classification groups 310.

FIG. 3B is a diagram of classification groups 320 with embedded service definition attributes. An advantage of embedded service definition attributes is that the service definition can be stored in the same object or data structure as the classification group, thereby increasing the efficiency with which the system 100 can retrieve the service definition.

Relationship Between Classification Groups and Other Aspects of the Data Model

In some embodiments, Signaling/Media Matching, Classification Groups, and Service Definitions can provide a complete data model for the application. However, in other embodiments, these techniques do not replace existing data models in a switching node (e.g., network server 110). In these embodiments, these concepts present an overlay or additional layer of control because some data models include an element of hierarchy based on the IP address space or application address space associated with the various elements and networks with which this node communicates (e.g., its peers). These hierarchies remain valid for some embodiments, and can be augmented with the additional techniques described herein to solve, for example, administration problems and provide additional flexibility.

Membership to Multiple Classification Groups

Figure 4:
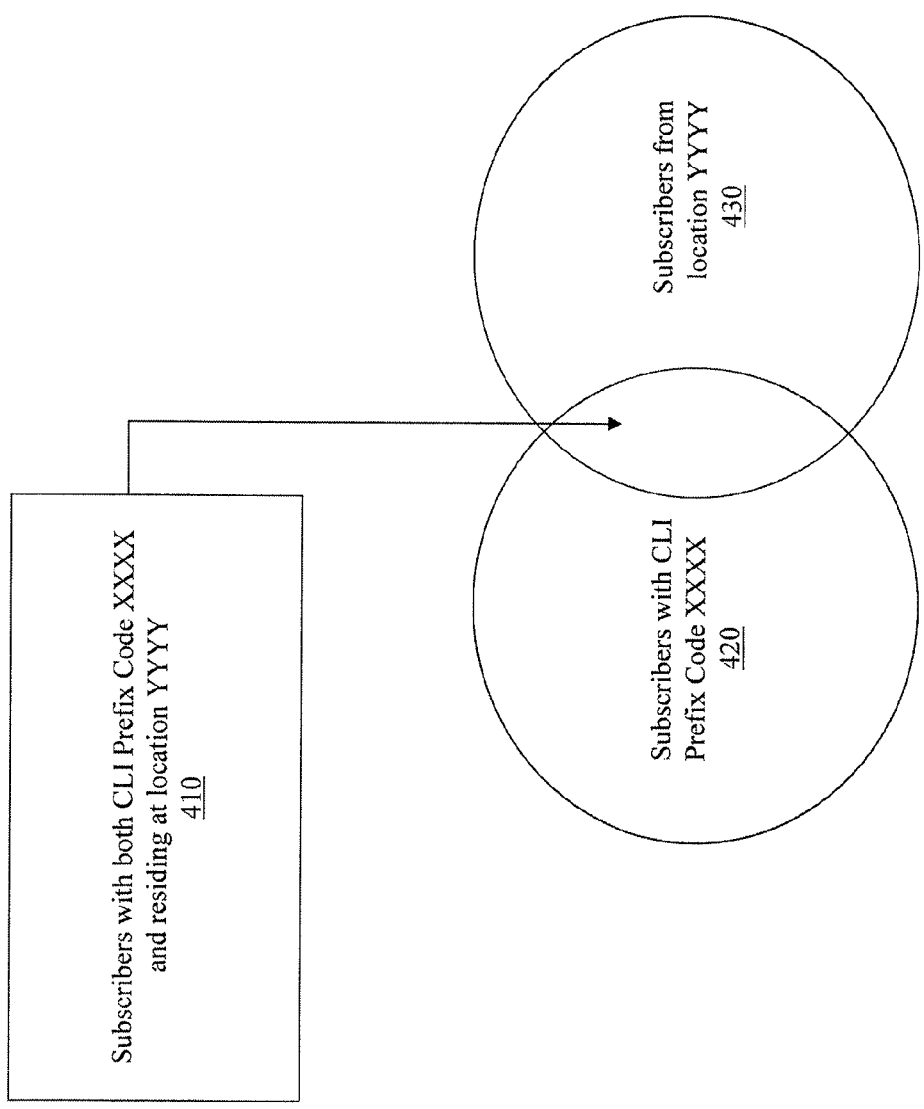
FIG. 4 is a block diagram of subscribers belonging to multiple classification groups.

FIG. 4 is a block diagram 400 of subscribers 410 belonging to multiple classification groups 420 and 430. In some embodiments, classification groups 420 and 430 are independent to each other and also to other elements in the data model. As a result, there is no conflict with an entity (e.g., subscribers 410) belonging to multiple classification groups 420 and 430 at the same time. The classification group matching module 120 tests an event for membership in the classification groups 420 and 430 and, if the events or subscribers 210 meet the entry criteria for more than one classification group (e.g., 420 and 430), the matching module 120 assigns the events or subscribers 410 to those classification groups 420 and 430.

In some embodiments, an entity (e.g., subscribers 410) receive the service (or restrictions) appropriate to multiple service definitions. These embodiments necessitate a kind of service broker arrangement which ensures that interactions, prioritizations, and overrides between separate service definitions are reconciled. Some embodiments avoid this reconciliation process by limiting membership of an entity to only one classification group. In these embodiments, the ordering of the classification groups 420 and 430, and evaluation of membership by the classification group matching module 120 is important. For example, the classification group matching module 120 may utilize a particular algorithm for assigning entities or events to a classification group (e.g., the first classification group match or the last classification group match, among others).

Event Association

In some embodiments, some events in the traffic flow 105 received by the network server 110 are independent of other events, while some events have a particular relationship with other events. This relationship can be complex. Generally, the network server 110 tracks events and their relationships using, for example, a finite state machine (FSM). Examples of finite state machines used by a network server 110 include a call FSM or a registration FSM.

In some embodiments, the classification group matching module 120 of the network server 110 tests events received in the traffic flow 105 to determine which (if any) classification groups 125 the events should be assigned, each time the event occurs or is received. In some embodiments, the classification group matching module 120 tests an initial event received from the traffic flow 105 and creates a binding to the event. The binding exists for a particular duration, and the classification group matching module 120 automatically assigns subsequent events associated with the binding to one or more classification groups 125 (e.g., those previously associated with the initial event).

The techniques described herein identify at least the following three ways in which events are associated with classification groups 125:

1) No Binding—the classification group matching module 120 tests each event independently as it arrives at the network server 110. The event either matches one or more classification groups 125 or does not match any classification groups 125.
2) Classification Group Owns the Binding—the classification groups 125 are extended to include a data structure (e.g. array, list, table, hash) identifying the events or subscribers that the classification group matching module 120 has matched to the classification groups 125.
3) Some Other Entity Owns the Binding—a logical entity associated with the events or subscribers owns the binding. For example, an FSM associated with call or registration events includes data associated with the events. The data includes one or more classification groups 125 that the classification group matching module 120 has assigned to the events.

The difference between Classification Group Owns the Binding and Some Other Entity Owns the Binding is how the keying/lookup works. When the classification group 125 owns the binding, the classification group 125 is the primary object and includes references to stateful objects tracking the traffic flow 105 (e.g., call/registration FSMs). Alternatively, when some other entity owns the binding, an existing structure (e.g., call/registration FSMs) is the primary object and the structure tracks the one or more classification groups to which the events are assigned.

Figure 5:
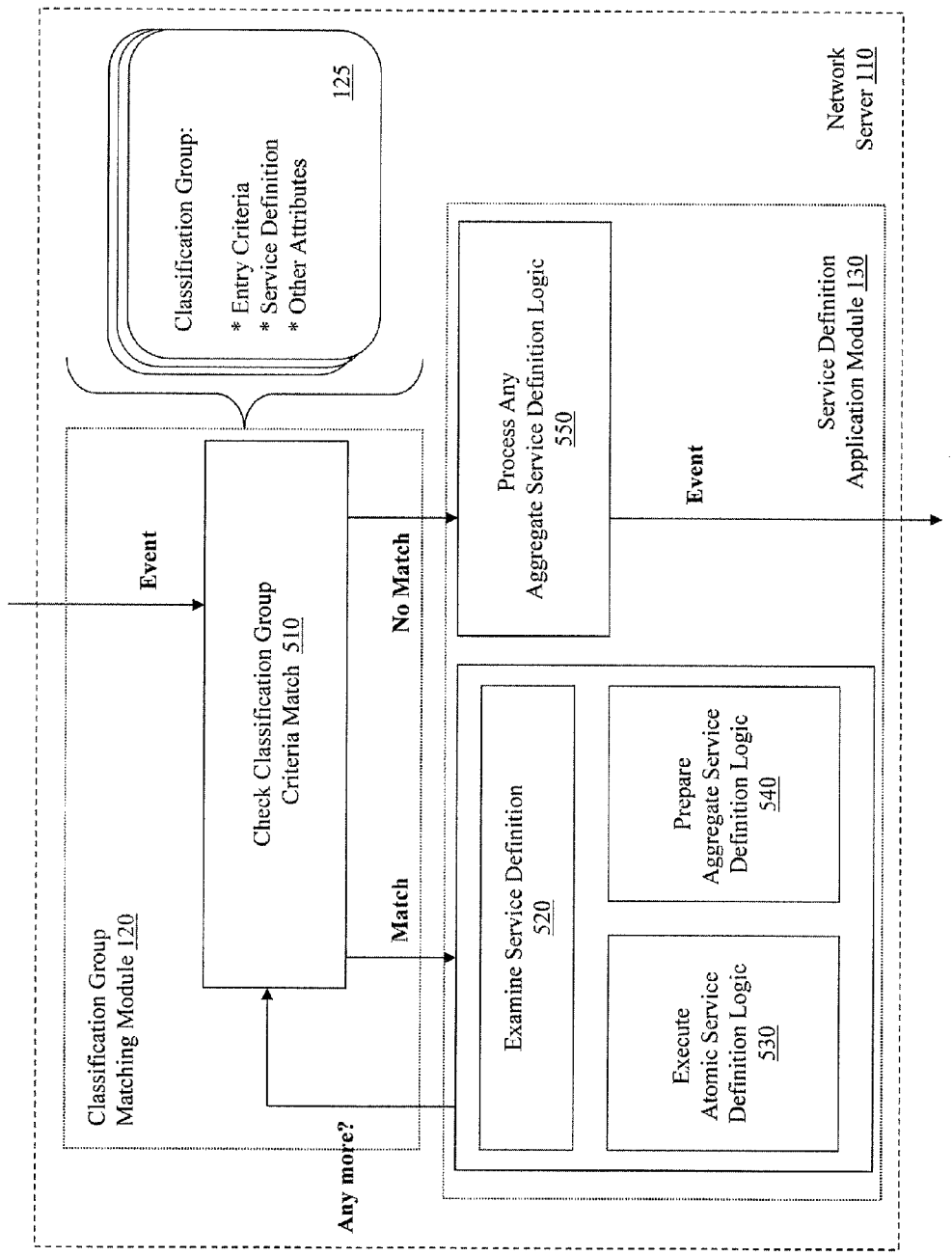
FIG. 5 is a flow diagram of an exemplary method for dynamic classification and grouping of network traffic for service application, with no permanent binding of events to classification groups.

FIG. 5 is a block diagram 500 of an exemplary method for dynamic classification and grouping of network traffic for service application, with no permanent binding of events to classification groups.

In FIG. 5, the classification group matching module 120 receives an event. The matching module 120 invokes a check classification group criteria match procedure 510. This procedure 510 compares the entry criteria of the classification groups 125 with attributes from the event and determines the classification groups 125 to which the event matches. Based on the matches, the classification group matching module 120 assigns the event to the matched classification groups. The service definition application module 130 examines (520) the service definitions associated with the matched classification groups. The application module 130 executes (530) any atomic service definition logic (e.g., service definitions from classification groups that are not related to or dependent on other classification groups). The application module 130 prepares (540) aggregate service definition logic based on the service definitions of the matched classification groups if the matched classification groups relate to or depend on each other. As part of the preparation of the aggregate service definition logic, the application module 130 reconciles the service definitions, for example, to remove conflicts or redundancies, and manage prioritization of the groups. An event may match one, many, or no classifications groups.

Once the service definition application module 130 has prepared the aggregate service definition logic, the application module 130 executes the aggregate logic. For example, an event can match multiple classification groups (e.g., groups X, Y, Z), where X is "UE of a particular type", Y is "calling ID belongs to this number range", and Z is "belongs to this enterprise group." The operator of the network server 110 may have applied a traffic policer to each of these classification groups (as they only want to permit certain traffic levels from this particular type of UE, or from a particular number range, or from a particular enterprise). In this example, the event matches all three classification groups. Therefore, it is undesirable for the event to pass through the traffic policer associated with the X and Y classification groups, but not pass through the traffic policer associated with the Z classification group without undoing charges associated with the X and Y policers. As a result, service definition logic for the X, Y, and Z classification groups is deferred until all classification groups have been matched. Then, the service definition logic is applied in aggregate.

Figure 6:
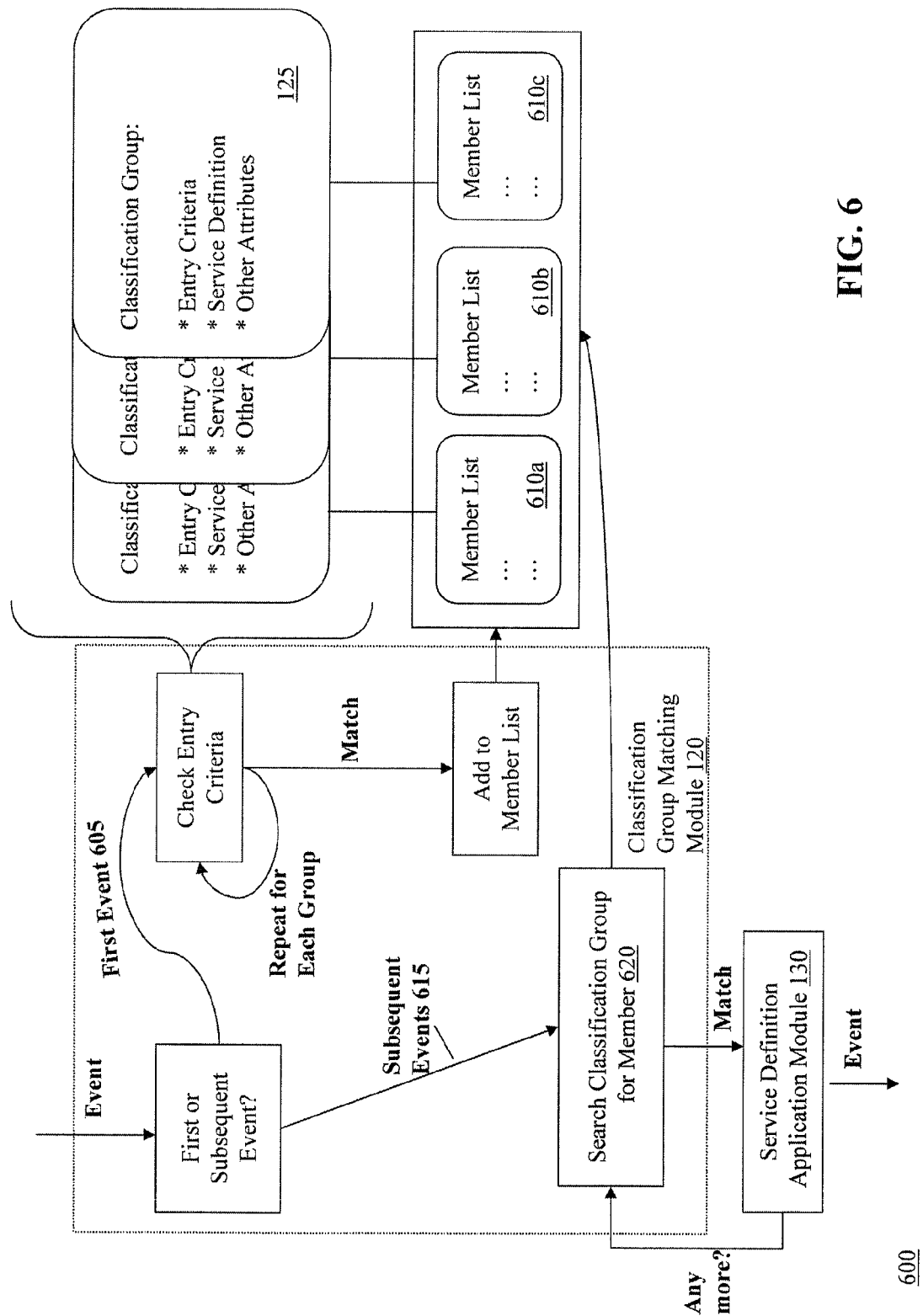
FIG. 6 is a flow diagram of an exemplary method for dynamic classification and grouping of network traffic for service application, where the events are bound to the classification group.

FIG. 6 is a block diagram 600 of an exemplary method for dynamic classification and grouping of network traffic for service application, where the events are bound to the classification group.

In this embodiment, an event received by the network server 110 represents the first in a set of related events (e.g., the first event in a call, or an event that registers a subscriber to obtain service). As it is desirable to remember the classification group membership as each event of the set of related events is received, the classification groups 125 each maintain a list of members (e.g., member lists 610a-c). A set of events (as defined by an initial event and subsequent related events) is referred to as a "member" in this embodiment. Members can be identified by some appropriate datum (e.g., calling line identity (CLI), address of record (AOR)). A member can belong to zero, one, or multiple classification groups 125. Upon identification of a new member (i.e., receipt of a first event in a new event sequence), the classification group matching module 120 compares attributes of the member with the entry criteria of the classification groups 125 to determine whether to assign the member to the classification groups.

The classification group matching module 120 passes all subsequent events 615 to the "search classification group for member" function 620. This function 620 analyzes the member lists 610a-c to determine whether the events are associated with a member that has already been assigned to classification groups 125. As a result, the matching module 120 assigns the events to zero, one, or multiple classification groups 125. Then, the service definition application module 130 examines the service definitions, executes atomic service definition logic, prepares aggregate service definition logic, and processes the aggregate service definition logic.

The embodiment depicted in FIG. 6 can be used if the network server 110 does not include other functionality or structures to track bindings between members and classification groups. However, some network servers include functionality to track bindings in an efficient manner.

Figure 7:
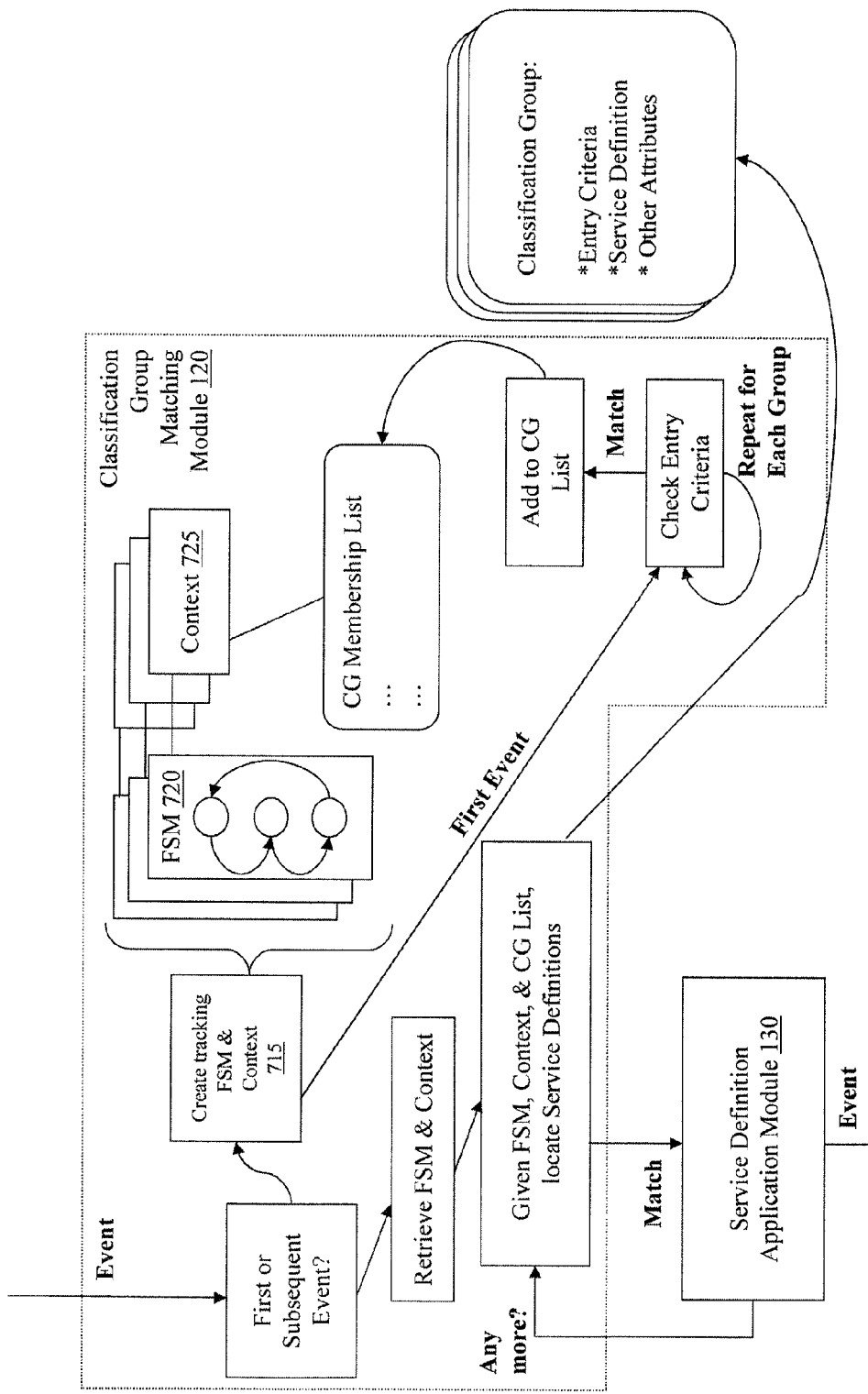
FIG. 7 is a flow diagram of an exemplary method for dynamic classification and grouping of network traffic for service application, where the events are bound to a finite state machine which includes the classification group.

FIG. 7 is a block diagram 700 of an exemplary method for dynamic classification and grouping of network traffic for service application, where the events are bound to a finite state machine (FSM) which includes the classification group.

In this embodiment, the network server 110 receives the initial event in a sequence of events (e.g., a SIP REGISTER event). The classification group matching module 120 creates (715) a context control block including an FSM 720 and Context 725 to track that sequence of events. Once the FSM 720 and Context 725 are created, the classification group matching module 120 compares the first event with entry criteria of the classification groups 125. If the classification group matching module 120 assigns the sequence of events to one or more classification groups 125, indicia identifying the classification groups 125 are stored in the Context 725 bound to the FSM 720. The stored indicia allow the classification group matching module 120 to match subsequent events in the sequence to the FSM 720 and Context 725 and efficiently determine the classification groups 125 to which the subsequent events are assigned.

In some embodiments, the classification group matching module 120 modifies the stored indicia based on matching subsequent events to entry criteria of one or more additional classification groups. Based on the modification of the stored indicia, the classification group matching module 120 can assign the subsequent events to additional classification groups or exclude the subsequent events from classification groups previously assigned to the first event. Thus, the FSM 720 and Context 725 can act dynamically to alter the existing classification group membership of the sequence of events (or the entire traffic flow) based on receipt and evaluation of subsequent events.

Figure 8:
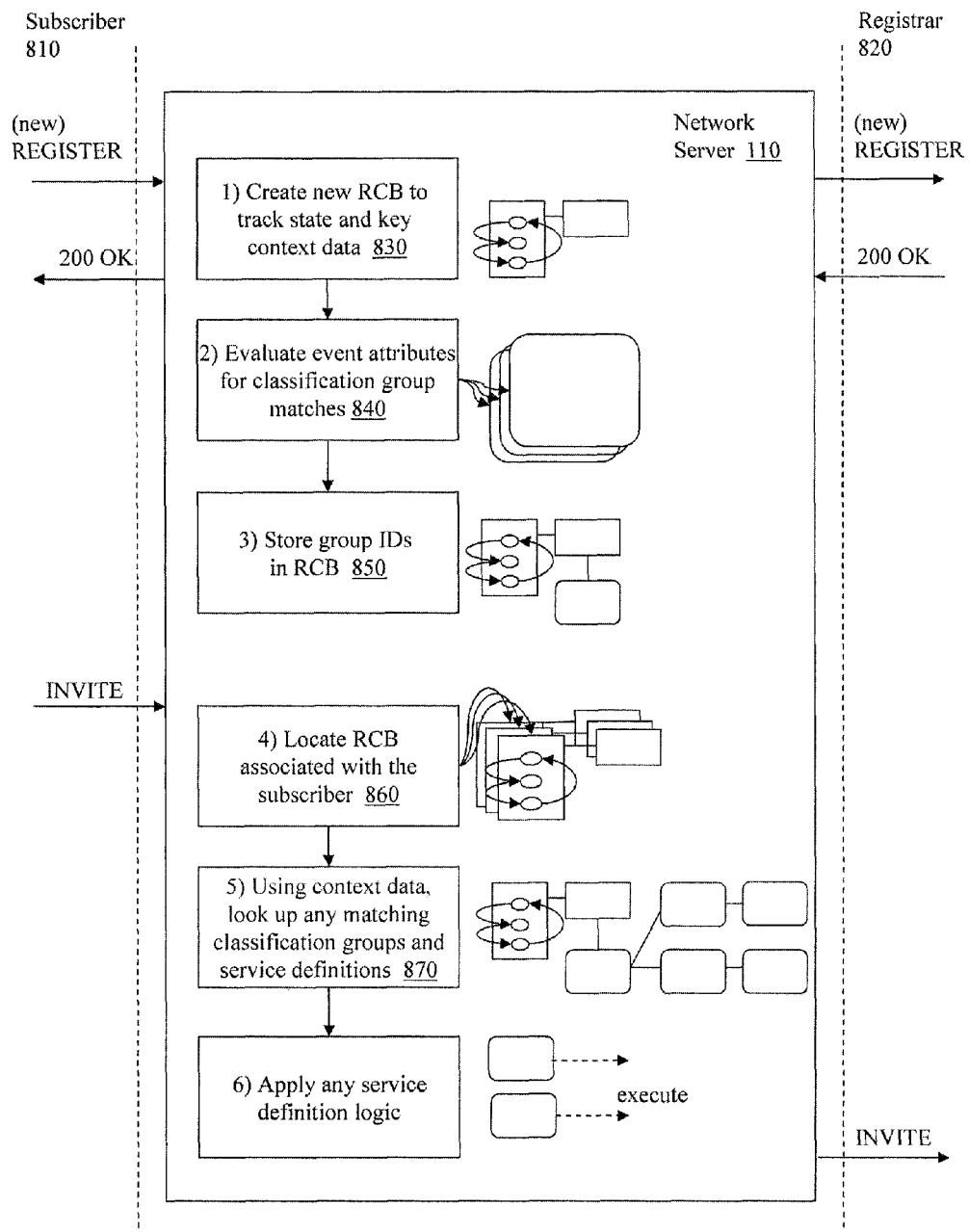
FIG. 8 is a flow diagram of an exemplary use case for processing of a SIP registration request by a network server.

FIG. 8 is a flow diagram 800 of an exemplary use case for processing of a SIP registration request by a network server 110 (e.g., a session border controller).

FIG. 8 illustrates network server 110 which relays a SIP registration request from a subscriber 810 to a registrar 820.
1) When a new REGISTER event is received from the subscriber 810, the network server 110 creates (830) registration control block (RCB), comprising a context/FSM. The RCB tracks the REGISTER event for the subscriber 810. The network server 110 determines that subsequent events (e.g., INVITE events) are related to the REGISTER event because the INVITE events are associated with the same subscriber 810.
2) Next, the network server 110 evaluates (840) the attributes of the REGISTER event to determine if the attributes match any of the patterns defined for the entry criteria of the classification groups configured on the network server 110.
3) The network server 110 stores (850) the matched classification groups in the RCB as a list of indicia identifying the matched groups. The network server 110 has access to the list for later use.
4) When the network server 110 receives a new INVITE event from the subscriber 810 who has already registered, the network server 110 locates (860) the RCB associated with that subscriber 810.

5) Because the RCB already includes a list of classification groups that are assigned to the subscriber (i.e., from classification of the REGISTER event), the network server 110 locates (870) the matching classification groups and associated service definitions. The new INVITE event inherits the classification groups previously matched to the REGISTER event.

6) Once the network server 110 has located the service definitions for the matching classification groups, the network server 110 applies (880) and executes the service definition logic for the subscriber 810.

An advantage of this technique is that any registering subscriber (e.g., subscriber 810) receives service and treatment without requiring predefined relationships to the classification groups.

In some embodiments, the network server 110 checks for additional classification group matches once the INVITE event is received from the subscriber 810. The additional classification group matches apply for the particular call associated with the INVITE event, rather than for the entire sequence of events associated with REGISTER event—which can include multiple calls. In one example, the call is to a particular number or destination, and should receive specific treatment (e.g., call gapping). In this example, the network server 110 tracks the classification group matches with a call-specific FSM and Context rather than utilizing the previously-created FSM and Context for the REGISTER event. The network server 110 can also execute a portion of service definition logic for just the INVITE event. In this example, the network server 110 does not already have a binding, and the network server 110 can execute a match algorithm (as set forth in FIG. 5).

Changes to Group Membership

As set forth above, the system 100 assigns one or more classification groups to events and/or subscribers (e.g., based on a SIP REGISTER event). The system 100 can bind and track assigned classification groups with the events, resulting in the application of service definition logic that exists for the duration of the sequence of events. The system 100 can associate the classification groups and service definition logic with subsequent events (e.g., additional calls) related to the same REGISTER event without requiring further evaluation of classification groups.

A further aspect of the techniques described herein is the ability to have classification group membership change (e.g., as subsequent events are received by the system 100). In some embodiments, the techniques provide for re-evaluation of classification group membership for each subsequent event received by the system 100. The system 100 can verify that the current classification group memberships are still valid for a particular sequence of events or a particular subscriber. The system 100 can also verify that additional classification groups are eligible to be assigned to the sequence of events, or that some or all of the currently-assigned classification groups should no longer be assigned to the sequence of events.

An example use case is:

1) The network server 110 receives an initial REGISTER event from a subscriber. The network server 110 assigns the event to a classification group for "standard users," and the network server 110 applies service definition logic associated with that classification group.

2) For subsequent calls (e.g., INVITE events), the network server 110 conducts another matching process against the classification groups, for example, if the network server 110 has determined that the subscriber uses a particular codec (e.g., a high rate codec such as AMR-WB). As a result of the matching process, the network server 110 assigns the events or the subscriber to a classification group for "premium users," and applies service definition logic associated with that classification group.

In some embodiments, changes to the classification group(s) for a sequence of events or a subscriber alters the manner in which the subscriber is billed, the manner in which the minutes expended on the call are accounted, or the way that bandwidth is reserved/allotted. The classification group change can exist as long as the subscriber is registered with the network server 110, or can only apply as a one-time override to that specific INVITE event.

In some embodiments, changes to the classification group(s) are based on triggers independent from the signaling events associated with a traffic flow. For example, if a node in the network is currently experiencing a high level of workload or is overloaded, the network server 110 can adjust group membership(s) of traffic flows such that the overloaded node receives less traffic from the network server 110. Conversely, if a node in the network is currently experiencing a low level of workload or is underutilized, the network server 110 can alter group membership(s) of traffic flows to send more traffic to the underutilized node. In another example, the network server 110 can evaluate the bandwidth and network utilization between nodes in the network to determine whether changes to the group membership(s) should be made.

In another example, the network server 110 can evaluate the availability of specific resources within a node to determine whether changes to the group membership(s) should be made. The network server 110 can alter group membership(s) of traffic flows such that less intensive services are offered in preference to more intensive services (e.g., DSP resources may be at a premium for transcoding within a particular node in the network). The network server 110 can also be evaluate the availability of specialized nodes within a network (e.g., media servers, legal intercept servers, voice mail servers) to determine whether changes to the group membership(s) should be made. These specialized nodes may act as a bottleneck for the delivery of services to users of the network.

In another example, the network server 110 can evaluate the availability of alternative routes or paths in a network to determine whether changes to group membership(s) should be made. In this example, there can be multiple routes within a network. The desirability of the individual routes can change (e.g., based on bandwidth, availability, cost). It may be advantageous to adjust group membership(s) to use the available routes more efficiently (e.g., least cost routing).

The techniques described herein provide for at least the following forms of classification group membership change:

1) Classification Groups are Purely Additive—once the system 100 has assigned an event or sequence of events to a classification group, the event(s) remain a member of the classification group for as long as the event(s) are tracked. In this embodiment, the system 100 adds more classification groups as they match the event(s) over time.

2) All Classification Groups are Re-evaluated for Each Event and Only the New Matches Count—this embodiment is illustrated in FIG. 5. The system 100 discards previously-matched classification groups and conducts the matching process for events as they are received by the network server 110.

3) All Classification Groups are Re-evaluated for Each Event and Existing Matches Remain—in this embodiment, the system 100 retains existing classification group matches even when additional events are received by the network server 110. The system 100 assigns additional classification groups as events are matched to these groups. Previously-existing classification group assignments continue to apply unless the system 100 explicitly removes the assignments via an instruction associated with a new classification group match. In this embodiment, a classification group optionally includes attributes pertaining to additional classification group relationships. For example, membership of an event in one classification group can impact an event's membership in other classification groups.

Figure 9:
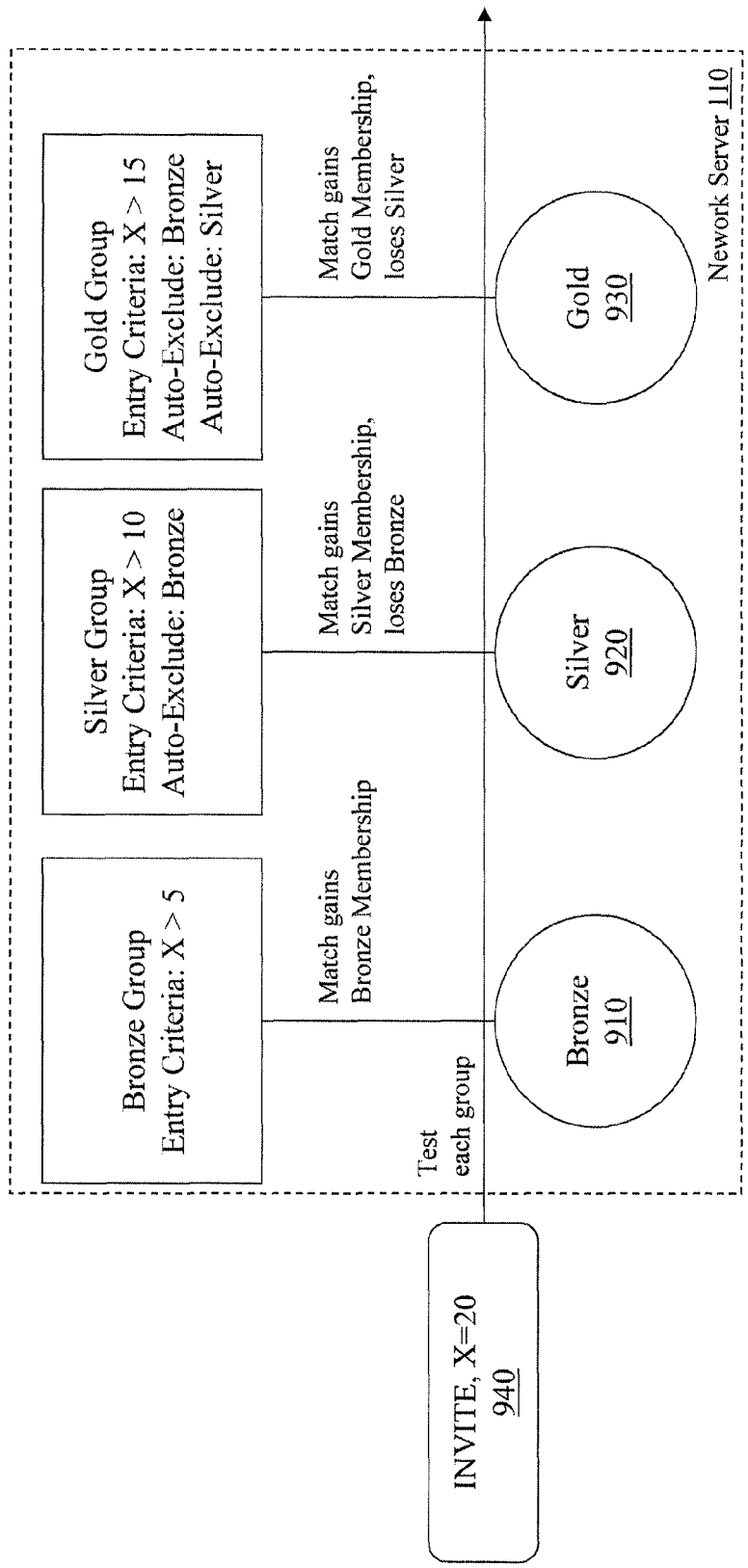
FIG. 9 is a block diagram of an exemplary method for automatically changing group membership based on exclusions.

FIG. 9 is a block diagram 900 of an exemplary method for automatically changing group membership based on exclusions.

In FIG. 9, the operator of the network server 110 has defined "bronze" (910), "silver" (920), and "gold" (930) levels of service as different classification groups. In this embodiment, a subscriber is initially assigned to the silver classification group 920. Based on the receipt of subsequent events, the network server 110 can change the classification group assigned to the subscriber (e.g., promoted to the gold group 930 or demoted the bronze group 910). In some examples, the entry criteria for the respective classification groups 910, 920, and 930 can result in the subscriber gaining membership in the gold, silver, and bronze classification groups. It may be undesirable to apply service definition logic to the subscriber for all three groups 910, 920 and 930. Instead, the operator of the system 100 may prefer that the highest level (e.g., gold 930) is the assigned classification group. By configuring the gold group 930 to include automatic exclusions for the silver 920 and bronze 910 groups, the system 100 removes the subscriber from membership in the silver and bronze groups when classification group selection is completed.

For example, the subscriber transmits an INVITE event 940 with an attribute of X=20 to the network server 110. The network server 110 evaluates the entry criteria for each classification group, beginning with the lowest group (e.g., bronze 910). Because X=20 and the entry criteria for the bronze group 910 is X>5, the subscriber gains membership into the bronze group 910. Next, the network server 110 evaluates the entry criteria for the silver group 920. Because X=20 and the entry criteria for the silver group 920 is X>10, the subscriber gains membership into the silver group 910. However, an additional attribute of the silver group 920 automatically excludes the subscriber from membership in the bronze group 910, so the subscriber is only a member of the silver group 920 at this point. Finally, the network server 110 evaluates the entry criteria for the gold group 930. Because X=20 and the entry criteria for the gold group 930 is X>15, the subscriber gains membership into the gold group 930. As with the silver group 920, the gold group 930 has an attribute that automatically excludes the subscriber from membership in the bronze and silver groups.

Figure 10:
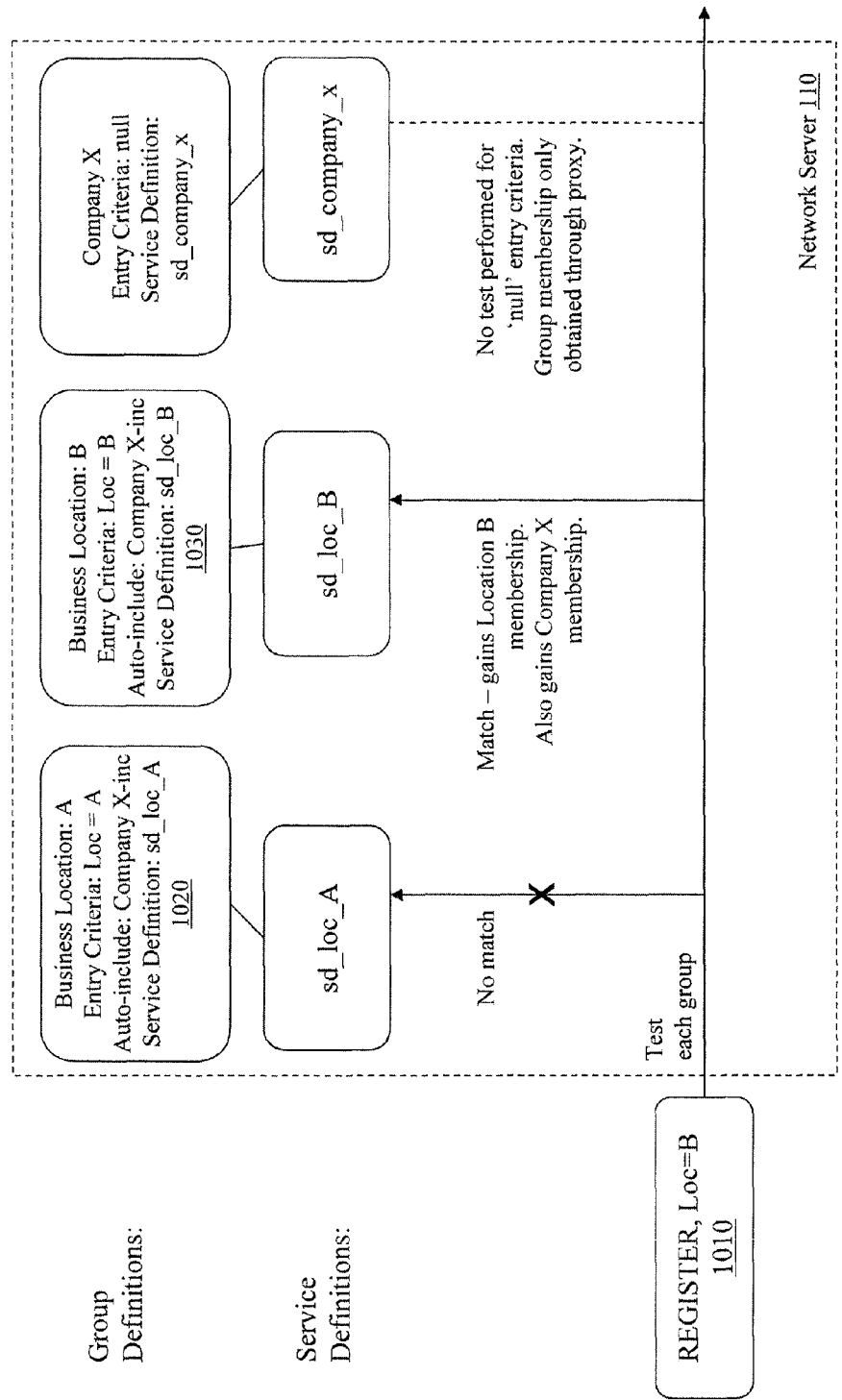
FIG. 10 is a block diagram of an exemplary method for automatically changing group membership to gain multiple memberships based on relationship rules.

FIG. 10 is a block diagram 1000 of an exemplary method for automatically changing group membership to gain multiple memberships based on relationship rules.

In the embodiment of FIG. 10, a company has multiple locations (e.g., Business Locations A and B). An operator may wish to provide specific service to each location (e.g., bandwidth limitations), and also some overall service to the company (e.g., call forwarding).

The network server 110 receives a REGISTER event 1010 from a subscriber. The event 1010 includes location data (e.g., Location=B) as part of the SIP signaling. One example of location data is Geographic Location/Privacy (GEOPRIV). The operator of the network server 110 has defined classification groups 1020 and 1030 for two business locations of the company (e.g., Locations A and B, respectively). The operator has also defined a classification group 1040 for the company as a whole (e.g., Company X). Each of the defined classification groups 1020, 1030, and 1040 are associated with service definitions (1025, 1035, and 1045, respectively) that contain logic to be applied to the subscriber's traffic flow.

The network server 110 evaluates the entry criteria for each classification group, beginning with the classification group 1020 for Location A. Because the Location attribute equals B in the REGISTER event 1010, the network server 110 determines that the event 1010 does not match the entry criteria for classification group 1020. Next, the network server 110 evaluates the entry criteria for the classification group 1030 for Location B. The network server 110 determines that REGISTER event 1010 matches the entry criteria for classification group 1030, and applies the associated service definition (e.g., sd_loc_B) to the subscriber's traffic flow. Also, the classification group 1030 includes an attribute that automatically includes the traffic flow in the classification group 1040 for Company X (e.g., because the subscriber is an employee of Company X, working at Location B). Although Company X has a separate classification group 1040, the group 1040 includes no entry criteria. As a result, the network server 110 only assigns group 1040 to traffic flows by proxy (e.g., through other classification groups 1020 and 1030 that contain attributes automatically including their members in group 1040).

Group Assignment/Re-assignment

In some embodiments, the techniques described herein utilize the output of service definition logic applied during call/session processing to alter the classification group assignments. For example, a subscriber Alice is assigned to a "normal user" classification group based on the signaling contents of the subscriber's traffic flow (e.g., flow 105). In this example, the switching node (e.g., network server 110) includes a calls-per-second (CPS) leaky bucket to limit the maximum permitted rate of calls that subscribers in the "normal user" classification group are allowed to initiate.

The network server 110 also includes another classification group called "heavy user," to which subscribers are assigned based on the signaling contents of the subscriber's traffic flow (e.g., flow 105) at registration time. The "heavy user" classification group permits its members to initiate a higher volume of calls based on, for example, payment of a premium for membership in the group.

In this use case, Alice is having a busy day and needs to initiate many calls. Although the service definition logic applied to her traffic flow is based on the "normal user" classification group, she frequently exceeds the CPS limit established for the "normal user" group. However, the network server 110 is not operating at full capacity during this time. As a result, the network server 110 is able to handle additional calls from Alice. The network server 110 determines that (i) the service definition logic applied to Alice's traffic flow corresponds to the "normal user" group, (ii) Alice frequently exceeds the CPS limit, and (iii) additional capacity is available on the network. The network server 100 permits Alice's traffic flow to be assigned temporarily to the "heavy user" group. For example, the network server 110 can notify Alice (e.g., via text message, email, letter) that she may want to consider upgrading and purchasing a higher usage plan. When the network server 110 starts to experience increased traffic flow levels, the network server 110 downgrades Alice's traffic flow back to its original classification group of "normal user."

The above-described techniques can be implemented in digital and/or analog electronic circuitry, or in computer hardware, firmware, software, or in combinations of them. The implementation can be as a computer program product, i.e., a computer program tangibly embodied in a machine-readable storage device, for execution by, or to control the operation of, a data processing apparatus, e.g., a programmable processor, a computer, and/or multiple computers. A computer program can be written in any form of computer or programming language, including source code, compiled code, interpreted code and/or machine code, and the computer program can be deployed in any form, including as a stand-alone program or as a subroutine, element, or other unit suitable for use in a computing environment. A computer program can be deployed to be executed on one computer or on multiple computers at one or more sites.

Method steps can be performed by one or more processors executing a computer program to perform functions of the invention by operating on input data and/or generating output data. Method steps can also be performed by, and an apparatus can be implemented as, special purpose logic circuitry, e.g., a FPGA (field programmable gate array), a FPAA (field-programmable analog array), a CPLD (complex programmable logic device), a PSoC (Programmable System-on-Chip), ASIP (application-specific instruction-set processor), or an ASIC (application-specific integrated circuit), or the like. Subroutines can refer to portions of the stored computer program and/or the processor, and/or the special circuitry that implement one or more functions.

Processors suitable for the execution of a computer program include, by way of example, both general and special purpose microprocessors, and any one or more processors of any kind of digital or analog computer. Generally, a processor receives instructions and data from a read-only memory or a random access memory or both. The essential elements of a computer are a processor for executing instructions and one or more memory devices for storing instructions and/or data. Memory devices, such as a cache, can be used to temporarily store data. Memory devices can also be used for long-term data storage. Generally, a computer also includes, or is operatively coupled to receive data from or transfer data to, or both, one or more mass storage devices for storing data, e.g., magnetic, magneto-optical disks, or optical disks. A computer can also be operatively coupled to a communications network in order to receive instructions and/or data from the network and/or to transfer instructions and/or data to the network. Computer-readable storage mediums suitable for embodying computer program instructions and data include all forms of volatile and non-volatile memory, including by way of example semiconductor memory devices, e.g., DRAM, SRAM, EPROM, EEPROM, and flash memory devices; magnetic disks, e.g., internal hard disks or removable disks; magneto-optical disks; and optical disks, e.g., CD, DVD, HD-DVD, and Blu-ray disks. The processor and the memory can be supplemented by and/or incorporated in special purpose logic circuitry.

To provide for interaction with a user, the above described techniques can be implemented on a computer in communication with a display device, e.g., a CRT (cathode ray tube), plasma, or LCD (liquid crystal display) monitor, for displaying information to the user and a keyboard and a pointing device, e.g., a mouse, a trackball, a touchpad, or a motion sensor, by which the user can provide input to the computer (e.g., interact with a user interface element). Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, and/or tactile input.

The above described techniques can be implemented in a distributed computing system that includes a back-end component. The back-end component can, for example, be a data server, a middleware component, and/or an application server. The above described techniques can be implemented in a distributed computing system that includes a front-end component. The front-end component can, for example, be a client computer having a graphical user interface, a Web browser through which a user can interact with an example implementation, and/or other graphical user interfaces for a transmitting device. The above described techniques can be implemented in a distributed computing system that includes any combination of such back-end, middleware, or front-end components.

The components of the computing system can be interconnected by transmission medium, which can include any form or medium of digital or analog data communication (e.g., a communication network). Transmission medium can include one or more packet-based networks and/or one or more circuit-based networks in any configuration. Packet-based networks can include, for example, the Internet, a carrier internet protocol (IP) network (e.g., local area network (LAN), wide area network (WAN), campus area network (CAN), metropolitan area network (MAN), home area network (HAN)), a private IP network, an IP private branch exchange (IPBX), a wireless network (e.g., radio access network (RAN), Bluetooth, Wi-Fi, WiMAX, general packet radio service (GPRS) network, HiperLAN), and/or other packet-based networks. Circuit-based networks can include, for example, the public switched telephone network (PSTN), a legacy private branch exchange (PBX), a wireless network (e.g., RAN, code-division multiple access (CDMA) network, time division multiple access (TDMA) network, global system for mobile communications (GSM) network), and/or other circuit-based networks.

Information transfer over transmission medium can be based on one or more communication protocols. Communication protocols can include, for example, Ethernet protocol, Internet Protocol (IP), Voice over IP (VOIP), a Peer-to-Peer (P2P) protocol, Hypertext Transfer Protocol (HTTP), Session Initiation Protocol (SIP), H.323, Media Gateway Control Protocol (MGCP), Signaling System #7 (SS7), a Global System for Mobile Communications (GSM) protocol, a Push-to-Talk (PTT) protocol, a PTT over Cellular (POC) protocol, and/or other communication protocols.

Devices of the computing system can include, for example, a computer, a computer with a browser device, a telephone, an IP phone, a mobile device (e.g., cellular phone, personal digital assistant (PDA) device, laptop computer, electronic mail device), and/or other communication devices. The browser device includes, for example, a computer (e.g., desktop computer, laptop computer) with a world wide web browser (e.g., Microsoft® Internet Explorer® available from Microsoft Corporation, Mozilla® Firefox available from Mozilla Corporation). Mobile computing device include, for example, a Blackberry®. IP phones include, for example, a Cisco® Unified IP Phone 7985G available from Cisco Systems, Inc, and/or a Cisco® Unified Wireless Phone 7920 available from Cisco Systems, Inc.

Comprise, include, and/or plural forms of each are open ended and include the listed parts and can include additional parts that are not listed. And/or is open ended and includes one or more of the listed parts and combinations of the listed parts.

One skilled in the art will realize the invention may be embodied in other specific forms without departing from the spirit or essential characteristics thereof. The foregoing embodiments are therefore to be considered in all respects illustrative rather than limiting of the invention described herein.

What is claimed is:

1. A method for applying service based on classification and grouping of traffic flows, the method comprising:
   receiving, at a network server, a traffic flow;
   matching, by the network server, the traffic flow to classification groups, wherein the matching comprises:
      determining a first event associated with the traffic flow;
      comparing attributes of the first event with entry criteria of the classification groups;
      assigning the first event to one or more classification groups where the first event meets the entry criteria of the one or more classification groups;
   identifying, by the network server, one or more service definitions for the traffic flow based on the classification groups assigned to the traffic flow;
   reconciling, by the network server, the one or more service definitions for the traffic flow; and
   providing, by the network server, a service to the traffic flow based on the reconciled one or more service definitions.

2. The method of claim 1, further comprising:
   automatically assigning the first event to one or more additional classification groups based on its assignment to the one or more classification groups.

3. The method of claim 2, wherein automatically assigning the first event to one or more additional classification groups is based on instructions in the one or more classification groups.

4. The method of claim 1, further comprising:
   automatically excluding the first event from one or more additional classification groups based on its assignment to the one or more classification groups.

5. The method of claim 4, wherein automatically excluding the first event from one or more additional classification groups is based on instructions in the one or more classification groups.

6. The method of claim 1, wherein the first event is a start of a sequence of events, the matching further comprising:
   analyzing a second event associated with the traffic flow to determine whether the second event is related to the first event; and
   assigning the second event to the one or more classification groups assigned to the first event.

7. The method of claim 6, further comprising:
   comparing attributes of the second event with a list of members belonging to the one or more classification groups, wherein the first event is assigned to a member in the list of members.

8. The method of claim 6, further comprising:
   comparing attributes of the second event with entry criteria of one or more additional classification groups; and
   assigning the second event to the one or more additional classification groups where the second event meets the entry criteria of the one or more additional classification groups.

9. The method of claim 8, wherein, for processing of the second event by the network server, the one or more additional classification groups override the classification groups previously assigned to the second event.

10. The method of claim 8, further comprising:
    excluding the second event from one or more of the classification groups assigned to the first event based on assignment of the second event to the one or more additional classification groups.

11. The method of claim 10, wherein exclusion of the second event from one or more of the classification groups assigned to the first event is based on instructions in the one or more additional classification groups.

12. The method of claim 1, wherein the first event is a start of a sequence of events, the matching further comprising:
    binding the sequence of events to the one or more classification groups assigned to the first event; and
    assigning subsequent events in the sequence of events to the one or more classification groups assigned to the first event.

13. The method of claim 12, wherein binding the sequence of events to the one or more classification groups further comprises:
    generating a data structure in each classification group of the one or more classification groups, wherein the data structure includes a reference to the sequence of events.

14. The method of claim 1, wherein the first event is a start of a sequence of events, the matching further comprising:
    instantiating a context control block upon determining the first event;
    storing indicia associated with the classification groups assigned to the first event in the context control block;
    analyzing, based on the stored indicia, subsequent events in the sequence of events associated with the traffic flow to determine whether the subsequent events are related to the first event; and
    assigning the subsequent events to the one or more classification groups assigned to the first event and stored in the context control block.

15. The method of claim 14, further comprising:
    assigning the subsequent events to one or more additional classification groups where attributes of the first event and attributes of the subsequent events are combined to meet entry criteria of the one or more additional classification groups.

16. The method of claim 14, further comprising:
    modifying the stored indicia based on the analysis of the subsequent events.

17. The method of claim 14, further comprising:
    modifying the classification group assignment of the subsequent events based on the analysis of the subsequent events.

18. The method of claim 17, wherein modifying the classification group assignment of the subsequent events includes adding the subsequent events to one or more additional classification groups, removing the subsequent events from one or more of the classification groups previously assigned to the subsequent events, or both.

19. The method of claim 14, wherein the context control block includes a finite state machine and a context.

20. The method of claim 1, wherein comparing attributes of the first event with entry criteria of the classification groups comprises:
    identifying one or more characteristics associated with the first event;
    comparing the identified characteristics to the entry criteria; and
    determining whether the identified characteristics match the entry criteria.

21. The method of claim 1, wherein reconciling the one or more service definitions for the traffic flow comprises:
configuring logic of the one or more service definitions to manage interactions between service definitions.

22. The method of claim 1, wherein providing a service to the traffic flow comprises:
executing logic associated with the reconciled one or more service definitions associated with the traffic flow.

23. The method of claim 22, further comprising:
modifying the classification group assignment of the traffic flow based on execution of the logic associated with the one or more service definitions.

24. The method of claim 1, wherein providing a service to the traffic flow comprises:
identifying a condition associated with a network; and
modifying the classification group assignment of the traffic flow based on analyzing the condition associated with the network.

25. The method of claim 24, wherein the condition associated with the network includes availability of a node connected to the network server, availability of resources within a node connected to the network server, bandwidth utilization between nodes in the network, availability of alternative routes between nodes in the network, or any combination thereof.

26. The method of claim 25, wherein availability of a node connected to the network server is based on a workload level associated with the node.

27. The method of claim 25, wherein availability of resources within a node connected to the network server is based on availability of data processing services offered by the node.

28. The method of claim 1, wherein the entry criteria of the classification groups include one or more of: rules for determining membership in the classification groups, parameters for determining membership in the classification groups, policies for determining membership in the classification groups, and patterns for determining membership in the classification groups.

29. The method of claim 1, wherein the attributes of the first event include signaling data, media type data, media content data, state data, or any combination thereof.

30. The method of claim 1, wherein the classification groups are independent of each other.

31. The method of claim 1, wherein the classification groups are independent of the one or more service definitions.

32. The method of claim 1, wherein the network server receives a definition of the classification groups from a central broadcast server.

33. The method of claim 1, wherein the network server includes a user interface, the user interface receiving configuration instructions for the classification groups.

34. The method of claim 33, wherein the user interface includes a display for viewing the classification groups and related configuration.

35. A system for applying service based on classification and grouping of traffic flows, the system comprising:
a network server apparatus configured to:
receive a traffic flow;
match the traffic flow to classification groups, wherein the matching comprises:
determining a first event associated with the traffic flow;
comparing attributes of the first event with entry criteria of the classification groups;
assigning the first event to one or more classification groups where the first event meets the entry criteria of the one or more classification groups;
identifying one or more service definitions for the traffic flow based on the classification groups assigned to the traffic flow;
reconcile the one or more service definitions for the traffic flow; and
provide a service to the traffic flow based on the reconciled one or more service definitions.

36. The system of claim 35, further comprising:
a user interface module, the user interface module configured to receive configuration instructions for the classification groups; and
a display for viewing the classification groups.

* * * * *